United States Patent [19]

Lin

[11] Patent Number: 5,449,426
[45] Date of Patent: Sep. 12, 1995

[54] PROCESS FOR PRODUCING LAMINATED ORNAMENTAL GLASS

[76] Inventor: Chii-Hsiung Lin, No. 55, Dai Jen Street, Kaohsiung, Taiwan

[21] Appl. No.: 238,220

[22] Filed: May 4, 1994

[51] Int. Cl.⁶ .................. B32B 17/00; B32B 31/12; B05D 5/06
[52] U.S. Cl. .................. 156/101; 156/219; 156/277; 427/261; 427/266; 427/270; 427/287; 427/389.7; 427/407.2; 427/162; 219/121.68; 219/121.69
[58] Field of Search ........... 156/58, 59, 99, 100, 156/101, 219, 277, 278; 427/258, 261, 266, 264, 269, 270, 287, 389.7, 407.2, 162, 165; 101/128.21; 219/121.68, 121.69; 346/76 L

[56] References Cited

U.S. PATENT DOCUMENTS

| | | | |
|---|---|---|---|
| 1,810,127 | 6/1931 | Carter | 427/269 X |
| 2,160,560 | 5/1939 | Parkinson | 427/266 |
| 2,251,144 | 7/1941 | Lytle | 427/266 X |
| 3,089,782 | 5/1963 | Bush et al. | 427/269 |
| 4,003,312 | 1/1977 | Gunther | 427/258 X |
| 4,065,311 | 12/1977 | Osborne | 427/258 X |
| 4,382,262 | 5/1983 | Savit | 346/135.1 X |
| 4,701,837 | 10/1987 | Skakaki et al. | 346/135.1 |
| 4,748,054 | 5/1988 | Wurr | 427/264 X |
| 4,937,103 | 6/1990 | Hess | 427/269 |
| 5,034,244 | 7/1991 | Berrer et al. | 427/266 X |

Primary Examiner—Michael W. Ball
Assistant Examiner—Francis J. Lorin
Attorney, Agent, or Firm—Dvorak and Traub

[57] ABSTRACT

The present invention relates to a process for producing a process for producing a laminated ornamental glass, comprising:

a) printing by a color inkjet printer an opaque, first coating layer having computer designed glazed painting or striped-figure pattern on the inner side of an outwardly facing glass substrate; by a color inkjet printer connected to a computer with a program of the design of said painting or pattern stored therein;

b) coating a second, white paint coating layer and a third, black or grey oil ink coating layer in turn over the first coating layer by conventional spray coating or roll coating method; after dried, c) engraving in an array or net figures selected from the group consisting of circles, tetragons, and hexagons on said coating layers by a laser engraving machine connected to said computer with a program of the design of said figures stored therein, leaving transparent coating-free crevice portions between said opaque patterned coating portions; and d) laminating with adhesive an inwardly-facing glass substrate over the coating layers and the outwardly-facing glass substrate through the crevice portions to obtain the laminated ornamental glass.

2 Claims, 5 Drawing Sheets

PROCESS FOR PRODUCING LAMINATED ORNAMENTAL GLASS

BACKGROUND OF THE INVENTION

This invention relates to a process for producing laminated ornamental glass which utilizes computer integrated manufacturing technique instead of conventional printing methods to have coating layers with desired painting or pattern printed or coated onto the glass substrate of the laminated ornamental glass in a more efficient and economical way than conventional processes.

As living standards improve, people are paying more attention to the construction of outer walls of buildings, windows and doors as well as interior decoration, furniture and partitions, with corresponding regard to luminosity, safety and privacy.

Conventionally, the ornamental glass for an interior partition, such as a screen or an inlaid plate of wall, is prepared by (1) printing a desired colored pattern directly onto a single sheet of glass, (2) reprinting on or adhering by an adhesive directly to a glass substrate a desired colored pattern which is printed in advance on a resin film or paper, or (3) printing a desired pattern of ceramic color frit onto a single sheet of glass followed by heat treatment and then coating a varnish on or adhering a resin film to said printed glass as a protective layer. As to the first two methods of producing conventional ornamental glass, the desired colored pattern printed by such methods on one of the surfaces of a single sheet of glass is exposed to the air, and is therefore subject to sunlight or oxidation so that the color of said pattern will change and fade, as well as being subject to damage when cleaning. In addition, among these aforementioned methods, some require a good printing technique for printing the desired colored pattern printed in advance on a resin film or paper on a sheet of glass, and glass-laminating skills for obtaining the desired delicate pattern as well as a bubble-free ornamental glass, so the cost of production is high. Moreover, the material of the colored pattern printed on conventional ornamental glass is an opaque glaze pigment, paint, oil ink or a mixture thereof which after a period of time will fade away while being exposed to sunshine (infrared ray or ultraviolet rays), so such ornamental glass can only be used indoors.

Consequently, as disclosed in U.S. patent application No. 07/966,480, now U.S. Pat. No. 5,370,913, which has been granted by the same applicant of the present invention, a laminated ornamental glass with three coating layers having pattern and figures printed or coated on the glass substrate thereof, which can be used indoors as well as outdoors, has been developed.

Conventional printing methods or otherwise for coating layers having pattern and figures can no longer satisfactorily and economically meet the increased demand by consumers for a variety in the design of pattern and figures of the coating layers. In addition, conventional printing methods or otherwise are time-consuming and cannot meet the increasing demand for shortening the period of production. Therefore, solutions to the above problems are desirable.

SUMMARY OF THE INVENTION

An object of the present invention is to provide a process for producing a laminated ornamental glass which can be used indoors as well as outdoors, i.e., use is not restricted to interior partitions, screen walls or ornamental inlaid plates but includes outer walls of a building, curtain walls of constructions, and the glass of doors and windows which are transparent and heat-insulating under different conditions of luminosity.

Another object of the present invention is to provide a process for producing a laminated ornamental glass which can be composed of two sheets of transparent or light-coloured, flat or bent, reinforced glass or an ion exchange reinforced glass, in which one of the two sheets is selected from polyester or polycarbonate resin according to the use.

A further object of the present invention is to provide a process for producing a laminated ornamental glass which can be transparent and heat-insulating. It can be produced by directly printing or coating a glazed painting or striped-figure pattern coating layer by a color inkjet printer connected to a computer with a program of the design of the painting or pattern stored therein on the inner surface of the outwardly-facing glass substrate, a white paint coating layer and a black or grey oil ink coating layer then in turn being printed or coated over the glazed painting or striped-figure coating layer and engraving figures selected from circles, tetragons, or hexagons out of the coating layers by a laser engraving machine as well connected to aforesaid computer with a program of the design of the figures stored therein after the coating layers dried. Therefore, the transparency and indoor luminosity can be optionally adjusted to the desired degree by changing the ratio of the sizes of the coating layers to the crevice portions between the coating layers.

Still another object of the present invention is to provide a process for producing a laminated ornamental glass which can employ adhesive admixed with infrared or ultraviolet absorbents for absorbing infrared rays or ultraviolet rays to render a heat insulation effect or have embedded in it metallic wires or net making it theft-proof or explosion-proof and said glass may be thickened as desired to increase penetration resistance, high net crack, and sound insulation.

Still a further object of the present invention is to provide a process for producing a laminated ornamental glass which can be indoor-used or outdoor-used without needing to be made by highly skilled printing or glass-laminating techniques. In other words, the aforementioned three coating layers formed by the glazed painting coating layer having intercrossing stripes or net configuration composed of circles or hexagons, the white paint coating layer and the black or grey oil ink coating layer can be coated or directly printed on the glass substrate simply by a conventional screen printing method, so that the laminated ornamental glass is easy to produce at a high production rate with a low rate of defects.

Still another object of the present invention is to provide a process for producing a laminated ornamental glass which can be economically and efficiently produced by a computer integrated manufacturing method instead of conventional printing methods or otherwise.

The term "array" is to be understood as including, for example, stripes which may be parallel, and the term "glass" is to be understood as including plastics materials.

BRIEF DESCRIPTION OF THE DRAWINGS

Laminated ornamental glass according to the present invention, and the prior art, will now be described in greater detail with reference to the accompanying drawings, in which.

DETAILED DESCRIPTION OF THE INVENTION

Figure 1:
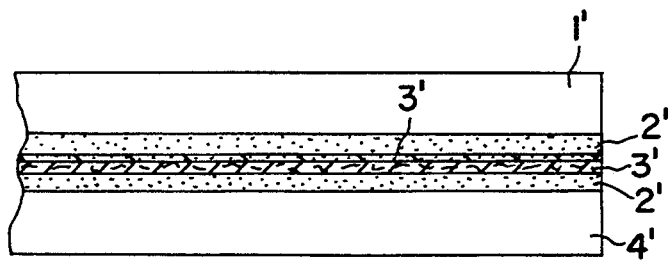
FIG. 1 is an enlarged cross-sectional view of the structure of a conventional laminated safety ornamental glass.
Figure 2:
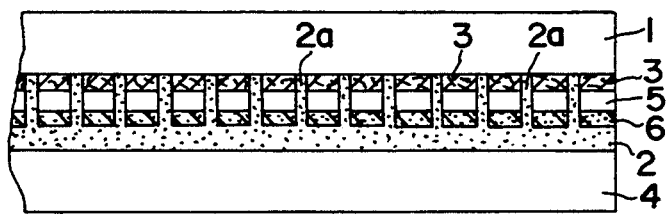
FIG. 2 is an enlarged cross-sectional view of the structure of an embodiment of the present invention.
Figure 3:
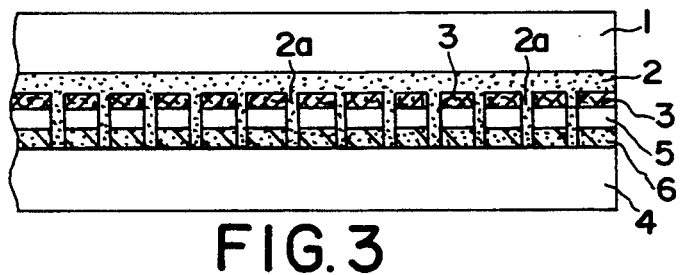
FIG. 3 is an enlarged cross-sectional view of the structure of another embodiment of the present invention.
Figure 4A:
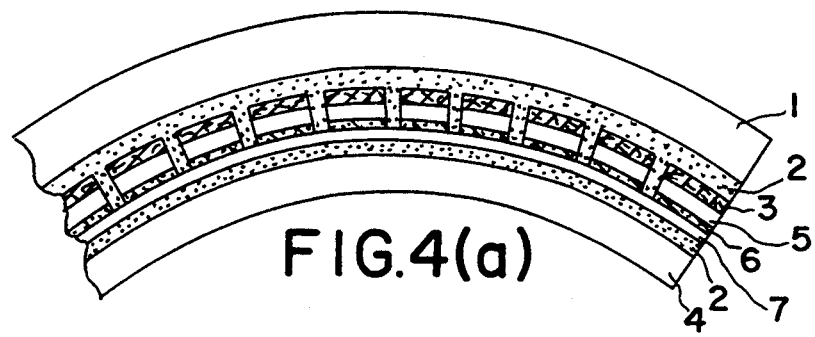
FIG. 4(a) is an enlarged cross-sectional view of the structure of a further embodiment of the present invention in which the glass substrate is bent rather than flat.
Figure 4B:
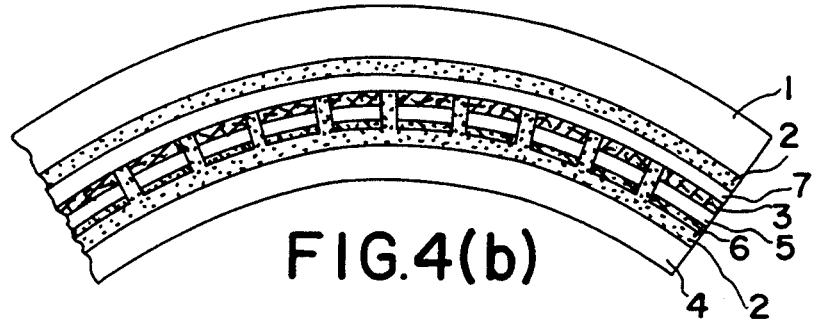
FIG. 4(b) is an enlarged cross-sectional view of the structure of an even further embodiment of the present invention in which the glass substrate is bent rather than flat.

According to the present invention, the process for producing a laminated ornamental glass comprises:

a) printing an opaque first coating layer having computer-designed glazed painting or striped-figure pattern on the inner side of an outwardly-facing glass substrate by a color inkjet printer connected to a computer with a program of the design of said painting or pattern stored therein;

b) coating a second, white paint coating layer and a third, black or grey oil ink coating layer in turn over the first coating layer by conventional spray coating or roll coating method; after dried, c) using a laser engraving machine connected to said computer to engrave in an array or net figures selected from the group consisting of circles, tetragons, and hexagons on the coating layers, leaving transparent coating-free crevice portions between said opaque patterned coating portions; and d) laminating with adhesive an inwardly-facing glass substrate over the coating layers and the outwardly-facing glass substrate through the crevice portions to obtain a laminated ornamental glass.

It will be appreciated that the design of the desired glazed painting, striped-figure pattern, and the figures selected from the group consisting of circles, tetragons, and hexagons which are arranged in an array or net are designed and edited by means of the CAD/CAE technique and written into a computer program which is filed in a floppy disk or the hard disk of a computer. In execution of the program, a first coating layer with desired glazed painting or striped-figure pattern can be directly printed onto the inner side of the outwardly-facing glass of this invention by a color inkjet printer connected to a computer with the aforesaid program stored therein. Likewise, after a second, white paint coating layer and a third, black or grey oil ink coating layer have been printed or coated over said first coating layer by conventional spray coating or roll coating method and dried, figures selected from the group consisting of circles, tetragons, and hexagons can then be engraved out of the coating layers by a laser engraving machine connected to the computer with aforesaid design program, leaving transparent coating-free crevice portions between said opaque coating portions.

It will be appreciated that the coating-free crevice portions between the patterned coating layers are filled by the adhesive in the process of lamination which involves the application of heat and pressure.

It will also be appreciated that, because the first coating layer is printed on the inner surface of the outwardly-facing glass substrate, and the white paint coating layer is positioned between the aforesaid layer and the black or grey oil ink coating layer, only the printing or coating pattern of the first coating layer rather than indoor objects can be seen when viewed from the outside of the building or room, whereas the black or grey coating pattern composed of for example circles or hexagons can be seen and outdoor objects can be seen through the coating-free crevice portions, when viewed from the inside of the building or room.

The interior luminosity is adjustable by simply changing the ratio of the sizes of the opaque coating patterns to the coating-free transparent crevice portions, for example, 9:1, 6.5:3.5, or 5:5, depending on the need to raise the rate of transparency from 3% to 65%.

The glazed painting, white paint and oil ink employed for the opaque coating layers are primarily prepared by mixing conventional ceramic color frit such as CaO, MnO, CdS, $Cr_2O_3$ or $Fe_2O_3$ 15 to 70 wt % with glass powder 30 to 85 wt % (the weight percentage is based on the total weight of the mixture obtained therefrom); most preferably the content of the ceramic color frit is no more than 30 wt % and that of the glass powder is no less than 30 wt % so that the adhesive force can be prevented from deterioration and sufficient coloration ability of the opaque material can be rendered.

The adhesive may be selected from polyvinyl butyryl resin, urethane resin, epoxy resin and methyl acrylate resin or a mixture thereof, and the thickness of each coating layer may range from 0.004 mm to 0.18 mm, so said coating layers will not fade under sunshine due to the use of heat-resistant ceramic color frit as material.

The laminated ornamental glass thus obtained may therefore be used not only as a glass with elegant and delicate coloured patterns for outwardly-facing windows or curtain walls of buildings but also as an ornamental inlaid material for outer walls of buildings. In addition, no duplicated virtual images or distorted static images can be seen on the surface of the laminated ornamental glass in which the intermediate coating layers are of opaque materials. Said intermediate coating layers may be thickened up to about 50 mm without the occurrence of the above-mentioned virtual problems. It means that the laminated ornamental glass of the present invention is 30% safer than conventional single sheet glass with the same thickness, and the penetration resistance, high net crack, sound insulation, and heat insulation will approach 100% when its thickness is up to 50 mm. Moreover, the adhesive may be further admixed with infrared or ultraviolet absorbents to absorb infrared rays or ultraviolet rays from outdoors, or embedded with steel wires or nets to make the glass become explosion-proof and theft-proof.

Conventional laminated ornamental glass, as shown in FIG. 1, is composed of an outwardly-facing transparent or light-colored plate glass substrate 1', two layers of resin adhesive 2', a layer of resin film or paper 3' with a glazed painting or other pattern printed or coated thereon, positioned between the two adhesive layers 2', and an inwardly-facing transparent or dark-colored heat ray absorbing plate glass substrate 4'. In other words, the glazed painting or other pattern of the conventional laminated ornamental glass is simply printed or coated on an intermediate layer of a resin film or paper 3' and then the patterned layer 3' is laminated between the plate glass substrates 1' and 4'. As the laminated ornamental glass thus obtained is not transparent, cannot be seen through, it can only be used for interior partitions or as an inlaid material for inner walls of buildings, rather than being used as an inlaid material for outer walls or the glass for outwardly-facing windows or curtain walls of buildings.

In FIGS. 2 to 5, however, 1 is an outwardly-facing transparent or translucent, flat or bent, plate glass substrate which is selected from sodium calcium silicates reinforced glass with or without heat treatment or sodium, potassium ion exchange reinforced glass; 2 is a conventional transparent adhesive which is selected from polyvinyl butyryl resin adhesive, polyester resin adhesive, methyl acrylate resin adhesive, urethane resin adhesive, two-component epoxy resin adhesive, one-component ultraviolet-sensitized curing adhesive, or one-component heating curing adhesive; 3, 5 and 6 are each a coating layer having an array of intercrossing stripes or net configuration composed of circles, tetragons, or hexagons, wherein 3 is an opaque glazed painting or other pattern coating layer, 5 is a white coating layer and 6 is an oil ink coating layer which together leave crevice portions 2a without any coating between the opaque patterned coating layers 3, 5 and 6; 3 is directly printed or coated by a conventional color inkjet printer (not shown in the figures) which is connected to a computer with a pre-written design program stored therein on the inner side of the outwardly-facing plate glass substrate 1; 5 and 6 are then in turn printed or coated over 1 by conventional spray coating or roll printing method followed by engraving in an array or net figures selected from circles, tetragons, or hexagons out of the coating layers by a laser engraving machine (not shown in the figures) connected to the computer as above-mentioned, leaving transparent coating-fee crevice portions 2a between the opaque, patterned coating portions; and 4 is an inwardly-facing transparent, light-colored, or translucent, flat or bent plate glass substrate which may be replaced by polyester or polycarbonate resin plate depending upon the desired use and need; in addition, 7 is a transparent flexible resin film which is most preferably selected from polyethylene terephthalate (PETE).

A metallic oxide coating layer with a mirror-reflecting effect instead of aforesaid glazed painting or other pattern coating layer may be printed or coated by a reflecting film treatment such as the application of the conventional vacuum deposition method or thermal decomposition oxidation film method on the glass substrate in a thickness ranging from 400 A to 1800 A to render the glass substrate a heat ray reflecting glass. Said metallic oxide is an oxidation paste selected from gold, silver, platinum, copper, tin, zinc, chromium, titanium, aluminum or nickel, or an alloy thereof.

Figure 6A:
FIG. 6(a) is a glazed painting view of the laminated ornamental glass of this invention with a pattern composed of circles employed as a part of an interior window when viewed from outside.
Figure 6B:
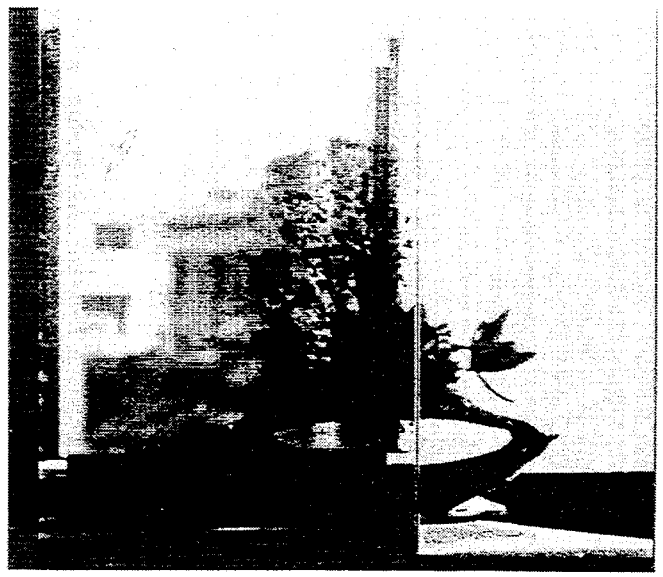
FIG. 6(b) is the opposite side view of FIG. 6(a)
Figure 7A:
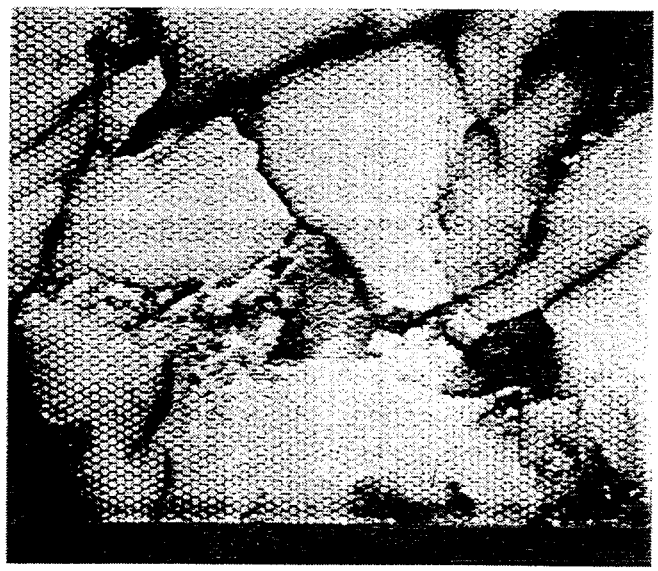
FIG. 7(a) is the same glazed painting view as in FIG. 6(a) except that a hexagonal pattern is used instead of circles.
Figure 7B:
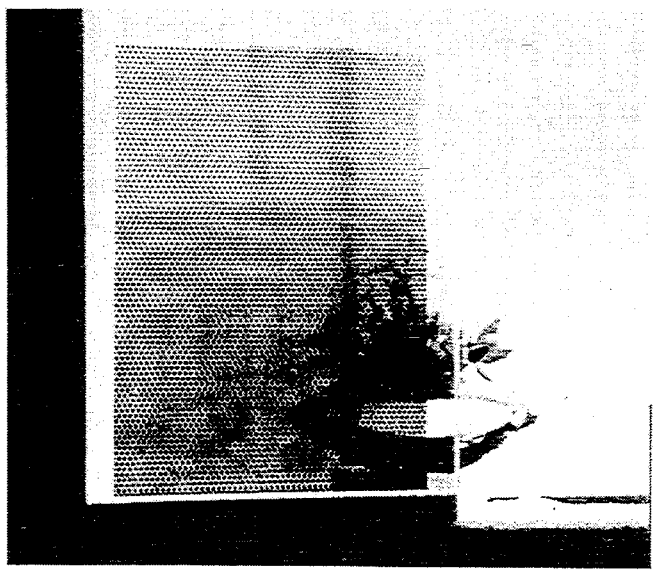
FIG. 7(b) is the opposite side view of FIG. 7(a)

The special features of the present invention are especially understood in terms of FIGS. 6 and 7. FIGS. 6(a) and 7(a) both show that no indoor objects but instead a glazed marble-pattern painting is seen when viewed from the outside, with the aforementioned coating-free crevice portions 2a being seen only obscurely. On the other hand, FIGS. 6(b) and 7(b) show that it is possible to see outdoor objects through said coating-free crevice portions 2a of the laminated ornamental glass of the invention when viewed from the inside.

Figure 5A:
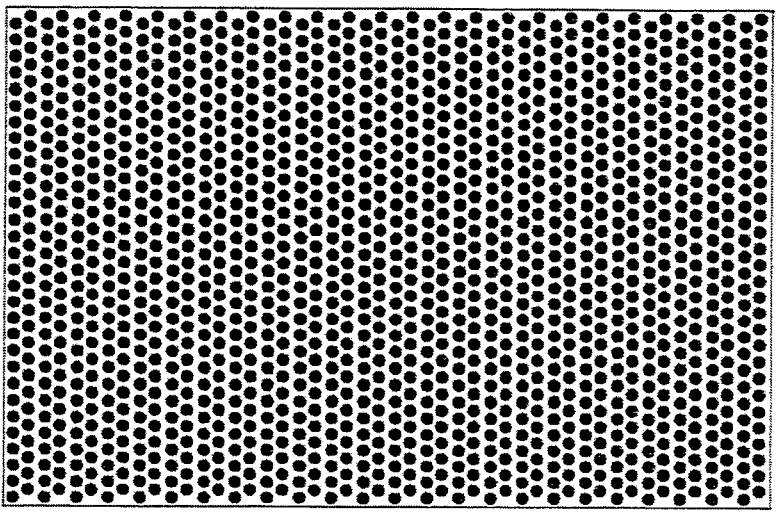
FIG. 5(a) is a view of a pattern composed of circles employed in this invention when viewed from inside.
Figure 5B:
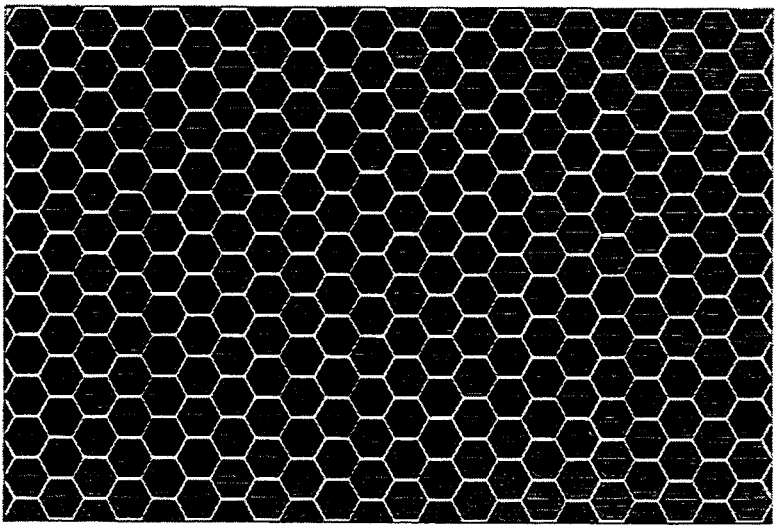
FIG. 5(b) is a view of a pattern composed of hexagons employed in this invention when viewed from inside.
Figure 5C:
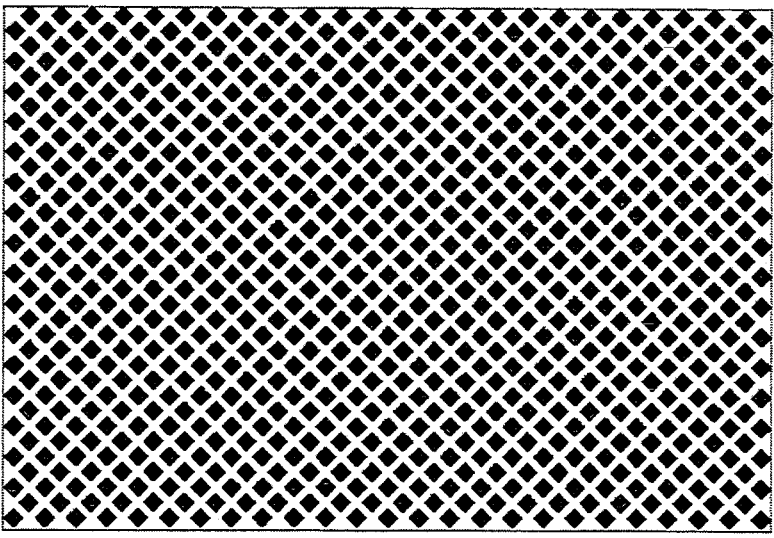
FIG. 5(c) is a view of a pattern composed of tetragons employed in this invention when viewed from inside.
Figure 8:
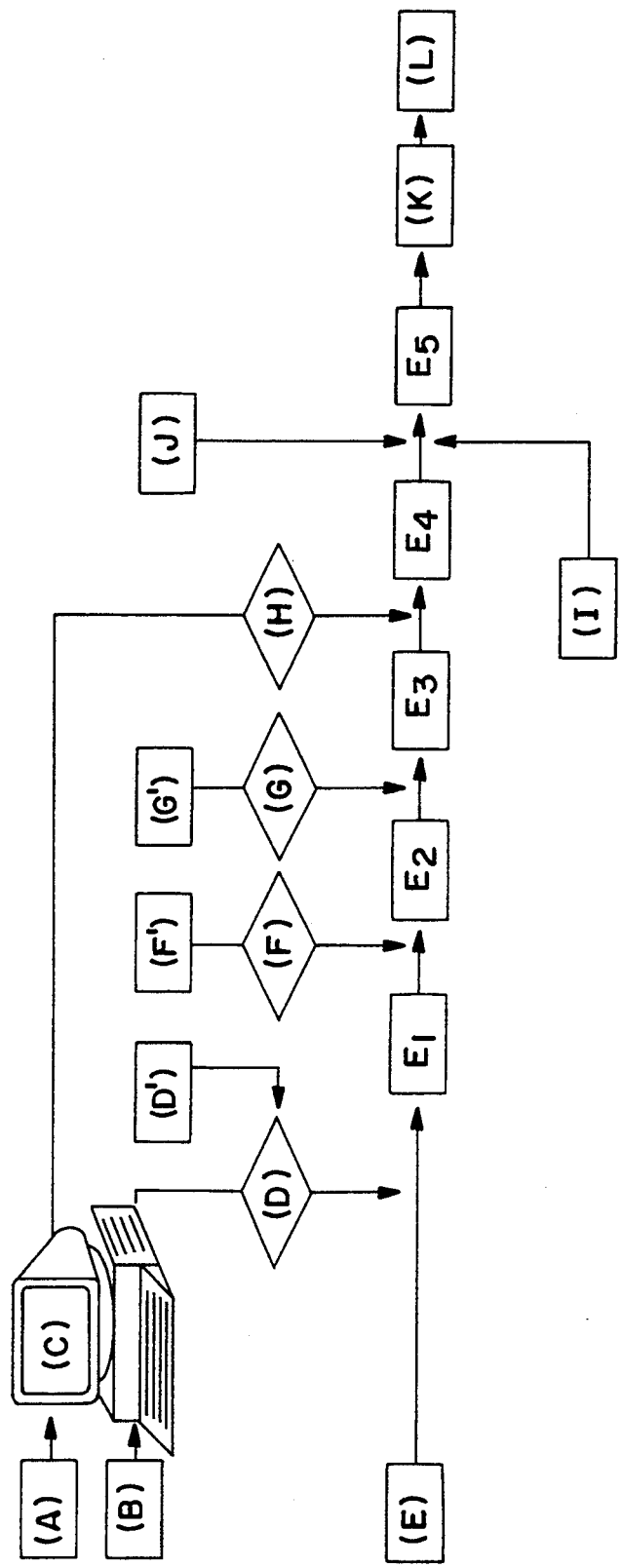
FIG. 8 is a block diagram of the process of the present invention.

As shown in FIG. 8, (A), which is the program of the design of the figures arranged in an array or net selected from circles, tetragons or hexagons as those indicated in FIGS. 5(a), 5(b) and 5(c) and (B), which is the program of the design of the desired glazed painting or striped-figure pattern as those indicated in FIGS. 6(a) and 7(a), are input into computer (C); (D) is a color inkjet printer connected to computer (c) and is attached to a pigment supplier (D') supplying three basic colors; (E) is an outwardly-facing, flat or bent plate glass substrate or polyethylene terephthalate film; (F) and (G) are the conventional spray coating or roll coating machine; (F') is the white paint and (G') is the black or grey oil ink; (H) is a laser engraving machine connected to computer (C) for producing figures executed by (A); and $E_1$, $E_2$, $E_3$, and $E_4$ each stand for the process of printing the first coating layer 3 having glazed painting or striped-figure pattern by the color inkjet printer (D) on the plate glass substrate 1 or PETE film 7, the process of coating the second, white coating layer 5, the process of coating the third, black or grey oil ink coating layer 6, and the process of engraving figures out of the coating layers 3, 5 and 6 by the laser engraving machine (H); following process $E_4$, an inwardly-facing plate glass substrate (I) is laminated by adhesive (J) with the intermediate product obtained from process $E_4$ (or laminating the intermediate product, if it is PETE film, between two sheets of bent plate glass substrates by adhesive(5)) to obtain a laminated glass structure ($E_5$), after a treatment of pressure and heat (K), a laminated ornamental glass having glazed painting or striped-figure pattern when viewed from outside is thus obtained.

What is claimed:

1. A process for producing a laminated ornamental glass, comprising:
    a) printing by a color inkjet printer an opaque, first coating layer having computer designed glazed painting or striped-figure pattern on the inner side of an outwardly facing glass substrate; by a color inkjet printer connected to a computer with a program of the design of said painting or pattern stored therein;
    b) coating a second, white paint coating layer and a third, black or grey oil ink coating layer in turn over the first coating layer by spray coating or roll coating method; after drying the paint and ink coatings,
    c) engraving in an array or net figures selected from the group consisting of circles, tetragons, and hexagons on said coating layers by a laser engraving machine connected to said computer with a program of the design of said figures stored therein, leaving transparent coating-free crevice portions between said opaque patterned coating portions; and d) laminating with adhesive a second glass substrate over the coating layers and the outwardly-facing glass substrate through the crevice portions to obtain the laminated ornamental glass.

2. A process for producing a laminated ornamental glass according to claim 1, wherein said coating layers are of thickness in a range between 0.04 mm to 0.18 mm.

* * * * *